Nov. 22, 1966    L. H. MORIN    3,287,483
METHOD OF PRODUCING SNELLED FISH HOOKS
Filed March 28, 1963
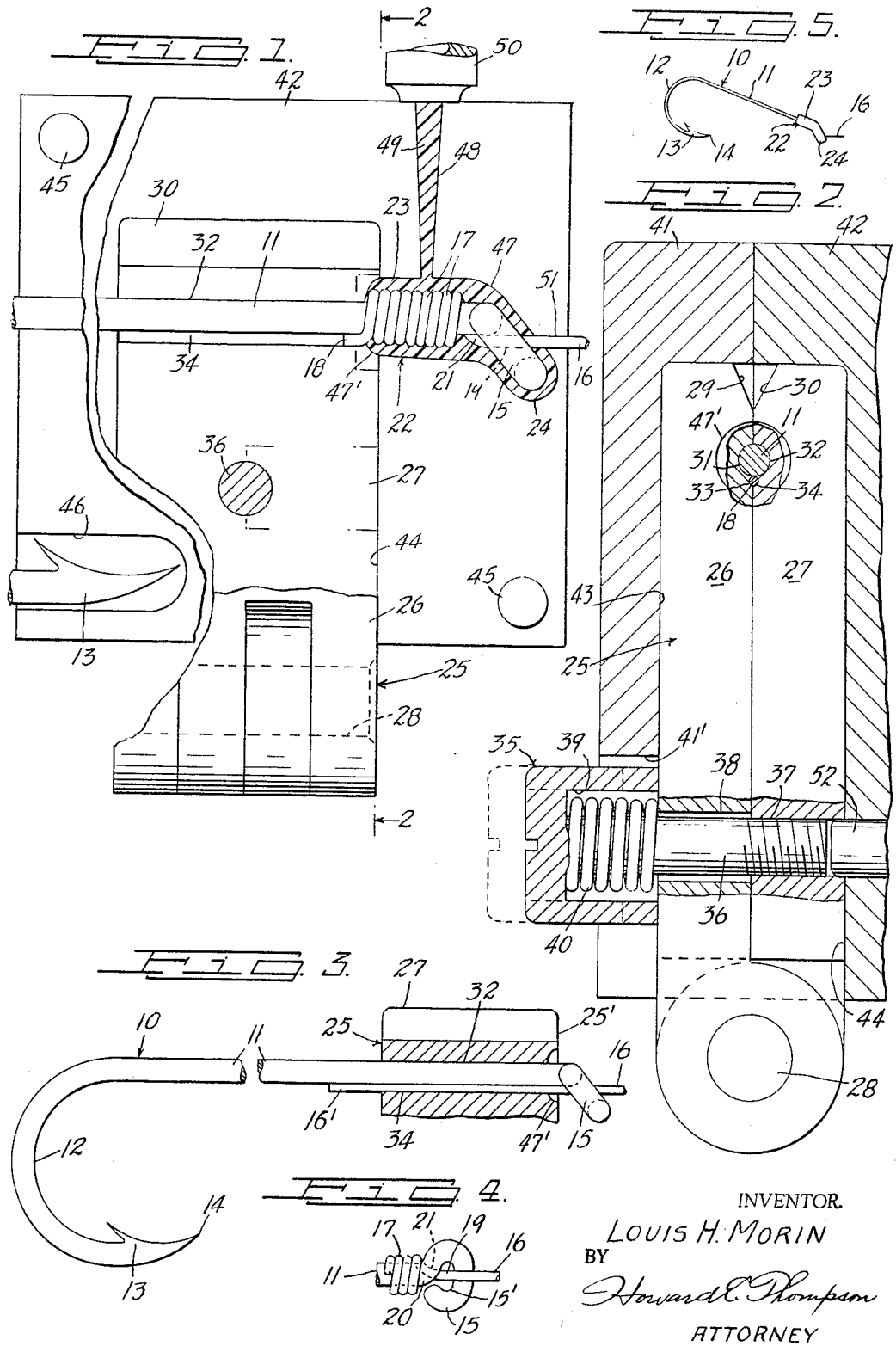
INVENTOR.
LOUIS H. MORIN
BY
Howard E. Thompson
ATTORNEY

United States Patent Office 3,287,483
Patented Nov. 22, 1966

3,287,483
METHOD OF PRODUCING SNELLED FISH HOOKS
Louis H. Morin, Bronx, N.Y., assignor of one-fourth to
Madeline F. McGill, Denver, Colo., and one-fourth to
J. R. Hanna, Bronxville, N.Y.
Filed Mar. 28, 1963, Ser. No. 268,766
7 Claims. (Cl. 264—161)

This invention relates to fish hooks employing a snell fixed to the shank portion of the hook and extending therefrom a predetermined length for attachment to a fishing line. More particularly, the invention deals with a method of attaching a snell with a fish hook and in retaining the snell on the fish hook by a molded body of plastic material, in which the attached end of the snell and adjacent part of the fish hook are encapsulated in positively retaining the snell against displacement from the fish hook.

Still more particularly, the invention deals with a method of forming fish hooks of the character defined, wherein the snell is wound upon the shank of the fish hook adjacent an offset eye end on the shank; whereupon, the molded plastic body is applied in production of the resulting end product.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a diagrammatic face view of one part of a die or mold which I employ, with parts of the construction broken away and showing the molded body formed on a fish hook in section;

FIG. 2 is a section on the broken lines 2—2 of FIG. 1 on an enlarged scale;

FIG. 3 is a detail view of part of a spring loaded fish hook holder, diagrammatically illustrating one step in carrying out my improved method, the section of FIG. 3 being slightly off-center from abutting surfaces of the two hinge parts of the holder;

FIG. 4 is a diagrammatic detail view, illustrating in part, the steps of helically winding the snell on the shank portion of a fish hook, the associated parts, as illustrated in FIG. 3 of the drawing, being omitted for sake of clarity; and FIG. 5 is a diagrammatic side view of a fish hook made according to my invention on a reduced scale with respect to the showings in FIGS. 1, 2 and 3 with respect to the other figures.

In illustrating one adaptation and use of my invention, I have shown at 10 one form of snelled fish hook construction, comprising an elongated shank 11, having a looped end portion 12, terminating at its free end in a conventional barb 13, including the pointed end 14. The other end of the shank 11 includes an angularly offset eye 15, shown in FIGS. 2 and 3 of the drawing, the offset of the eye being in the direction indicated in the showing in FIG. 1.

At 16 is shown a snell or monofilament, which is attached to the hook by a series of helical windings, as clearly shown at 17 in FIG. 1 between a terminal end 18 of the snell and the portion 19 thereof extending through the offset eye 15, as clearly illustrated in FIGS. 1 and 4 of the drawing. The snell, in extending from the helical windings 17, passes around the curved portion 20 of the eye adjacent the shank 11, as indicated at 21. Shading of the parts of the device has been dispensed with, in order to clearly illustrate the structural arrangement.

The eye end portion of the hook is encapsulated in a molded plastic body 22 of nylon or other suitable plastic material, so as to completely envelop the windings 17 and that part of the shank upon which the windings are arranged in a more or less cylindrical portion 23 of the molded body 22; whereas, the eye proper of the hook and that part of the snell disposed in the environment of the eye are enclosed in the offset portion 24 of the body 22.

In forming snelled fish hooks of the character defined, the following method of procedure is followed. The fish hook, or the shank portion thereof, is positioned in a spring loaded holder 25, consisting of a pair of jaws 26 and 27 hinged together by a hinge pin 28 for relative movement toward and from each other, adjacent surfaces of the jaws at the free ends thereof being bevelled, as seen at 29 and 30, respectively, to facilitate pressure positioning the shank 11 of the hook in alined transverse recesses 31 and 32 of the jaws, as clearly illustrated in FIGS. 1, 2 and 3 of the drawing. Registering with the recesses 31 and 32 are other smaller diameter recesses 33 and 34 for reception of the snell 16, as clearly illustrated in FIGS. 2 and 3 of the drawing.

The spring loading of the holder 25 is accomplished by a hollow headed screw 35, note FIG. 2, the shank 36 of which is threaded to engage a threaded bore 37 in the jaw 27, the jaw 26 having a large diameter aperture 38, in which the shank 36 is freely arranged to compensate for swinging movement of the jaws one with respect to the other on the pivot 28. Arranged on the shank 36, within the hollow chamber 39 of the screw 35, is a coil spring 40, which normally applies spring pressure to the jaw 26 in maintaining the jaws in engagement with each other and in gripping engagement with the shank 11 of the hook. In this engagement of the jaws, the screw 35 is in the dotted position of FIG. 2; whereas, in the full line position of the screw, the jaws 26 and 27 are held in definite pressure engagement with each other and 11 and 18.

In carrying out my method, I provide a pair of dies or molds 41 and 42, not FIG. 2, a face view of the die 42 being shown in FIG. 1 of the drawing. The dies are recessed, as seen at 43 and 44, to receive the holder 25, the jaw 26 of the holder seating in 43 and the jaw 27 of the holder seating in 44. Arranged on the face of the die 42 are alinement pins 45 for alinement of the die 41 with the die 42. Both dies have, on adjacent surfaces thereof, registering recesses, one of these recesses on the dies 42 being shown at 46 in FIG. 1 of the drawing, and these registering recesses are adapted to receive the barb end portion 13 of a fish hook, as indicated in FIG. 1 of the drawing, as and when the casting and molding operation is performed. Adjacent surfaces of the dies 41 and 42 have cavities collectively forming the impression cavity 47 for forming the molded body 22, referred to previously. In this connection, it is to be noted that the holder 25, or the jaws 26 and 27 thereof, form a part of the cavity 47 by cavity portions on adjacent surfaces thereof, as indicated at 47' in FIG. 2 of the drawing, so that the body 22 can extend to and completely envelop the windings 17, as diagrammatically illustrated in said figure. On adjacent surfaces of the dies 41 and 42 is also formed a sprue or gate passage 48, through which the plastic material 49 from an injection nozzle 50 can extend to the cavity 47. The adjacent surfaces of the dies also have other alined recesses, as at 51, for reception of the snell, where it passes beyond the eye end 15 of the hook to control location or positioning of the snell with respect to the eye end 15 and the resulting molded body 22.

In carrying out my method, the first step consists in arranging an elongated end portion 16' of a snell in the holder or the recesses 33, 34 thereof adjacent the shank 11, as illustrated in FIG. 3 of the drawing, and with the eye 15 arranged outwardly of the side surface 25' of the holder 25, as clearly shown in said figure. The hook 10 is then rotated in the holder 25 so as to apply the helical windings 17 on the shank to any predetermined degree, depending upon the number of windings required on a fish hook of any particular size or construction. In FIG. 1 of the drawing, it will appear that the windings 17 comprise substantially nine turns, leaving a short end 18 extending beyond the last turn. The length of the end 16' will govern the number of turns or windings to be applied to the shank 11.

On completing the first operation, the screw 35 is firmly tightened, so as to retain the jaws 26 and 27 in positive engagement with each other and in engagement with the shank 11 and the end 18 of the snell; whereupon, the holder 25 is positioned in the die 42, said die having a pin or other means 52 registering with the bore 37 for definitely positioning the holder in the die; whereupon, the other die 41 is moved into closed position on the die 42. In this connection, it will be apparent that the die 41 is apertured, as at 41', to receive the screw 35.

With the parts in this position, the plastic material can be pressure injected into the cavity 47 to form the molded body 22; whereupon, the dies are separated, the holder, together with the molded body 22 and the gate, are removed from the dies, the gate trimmed and the jaws separated for removal of the snelled fish hook therefrom; whereupon, another fish hook is assembled with the holder and the above cycle of operation is repeated in forming the next successive end product.

In the molding operation, it will be apparent that the plastic material of the molded body completely envelops and fills all crevices or spaces around the windings 17, the shank 11 and the eye 15, in other words, completely filling the opening 15' in the eye, as shown in FIG. 4 of the drawing. When the molded body 22 has been formed upon the eye end portion of the hook, the snell will be fixedly retained against displacement from the hook by said molded body.

In the above described operation of attaching the snell to the shank, it will be understood that the shank of the hook can first be supported in the holder 25, after which, the snell 16 can be fed through the eye 15 into the passage 34 for a predetermined distance, as indicated at 16' in FIG. 3, to provide the desired number of turns or windings, as at 17. In winding the snell on the shank, it will be understood that, in the first stage of this operation, the offset eye 15 engages the surface 25' of the holder 25, as indicated in FIG. 3, and, as the helical windings of the snell are formed on the shank, these windings will develop in the cavity portions 47' and, as they are formed, the fish hook or the shank thereof is fed from left to right, as viewed in the drawing, until the position shown in FIG. 1 is reached, at which time the screw 35 is tightened in securely retaining the fish hook in the position as seen in FIG. 1 for location of the same and the holder 25 in the dies, as previously stated.

Having fully described my invention, what I claim as new and desire to secure by Letters Patent is:

1. The method of producing snelled fish hooks, which comprises first rotating a fish hook in a holder to wind the snell on the shank of a fish hook adjacent an eye at one end of said shank, extending the windings on the fish hook beyond said holder, then moving a pair of molding dies into engagement with said holder and enveloping said eye and winding on said shank, then pressure injecting plastic material into a cavity of said dies to form a molded body of plastic material encapsulating said eye and snell winding, and then separating the dies and trimming the molded body to form a final end product.

2. A method as defined in claim 1, wherein part of the cavity forming said molded body extends into said holder, the eye of said fish hook being offset with respect to the shank, and the snell extending from the winding through and beyond said eye.

3. The method of producing snelled fish hooks of the character defined, wherein the fish hook has an offset eye at one end portion, which comprises first arranging the shank of a fish hook adjacent said eye in a holder having a passage supporting an end portion of a snell longitudinally of said shank supported in the holder, rotating the fish hook in the holder in disposing a number of windings on the shank adjacent the offset eye end of the shank, fixedly securing the fish hook with the snell wound thereon in said holder, then placing the holder in a pair of dies with the eye end portion of the shank including the snell windings thereon disposed in a cavity of said dies, then pressure injecting plastic material into the cavity of the dies to completely envelop the eye, shank and the snell windings thereon in a body of plastic material, then separating the dies and removing the holder and fish hook therefrom, and then removing the gate from the molded body in forming the resulting end product.

4. A method as defined in claim 3, wherein the holder employed comprises a pair of pivoted jaws, and wherein means is employed for yieldably and positively retaining the jaws in engagement with each other.

5. A method as defined in claim 3, wherein part of the cavity forming the molded body is disposed in a surface of the holder to insure complete envelopment of the snell windings by said molded body.

6. A method as defined in claim 4, wherein the jaws of said holder are formed to facilitate attachment of the fish hook shank with the holder when said jaws are in tensional engagement with each other.

7. The method of producing snelled fish hooks of the character defined, which consists in yieldably supporting the shank of a fish hook in a holder with an offset eye end of the shank adjacent a surface of said holder, feeding an end portion of a snell into the holder through said eye to dispose said end portion of the snell adjacent and parallel with the shank of the fish hook, then rotating the fish hook in said holder to wind said end portion of the snell on the shank a predetermined number of turns adjacent said offset eye, disposing the last turn of the snell in a cavity portion of said holder, registering said cavity portion with a cavity of suitable dies, in which the eye end of the shank and that part of the shank having the snell windings thereon is disposed, then pressure injecting a plastic material into the cavity of the dies and the cavity portion of said holder in forming a molded plastic body completely enveloping said eye and the snell windings on said shank, and then trimming the molded body in forming the resulting end snelled fish hook product.

References Cited by the Examiner

UNITED STATES PATENTS

| | | | |
|---|---|---|---|
| 1,093,000 | 4/1914 | Kinsey | 43—44.83 |
| 2,094,267 | 9/1937 | Faria | 43—44.83 |
| 2,636,307 | 4/1953 | Mason et al. | 53—44.83 |
| 2,643,418 | 6/1953 | Auldridge | 264—275 X |
| 3,169,299 | 2/1965 | Morin | 264—263 X |
| 3,226,463 | 12/1965 | Wallace | 264—275 X |

ROBERT F. WHITE, *Primary Examiner.*

L. S. SQUIRES, *Assistant Examiner.*